July 4, 1972 D. WELLE 3,674,391
APPARATUS FOR PRODUCING AND DECORATING HOLLOW BODIES
MADE OF THERMOPLASTIC MATERIAL
Filed Jan. 13, 1970 5 Sheets-Sheet 3
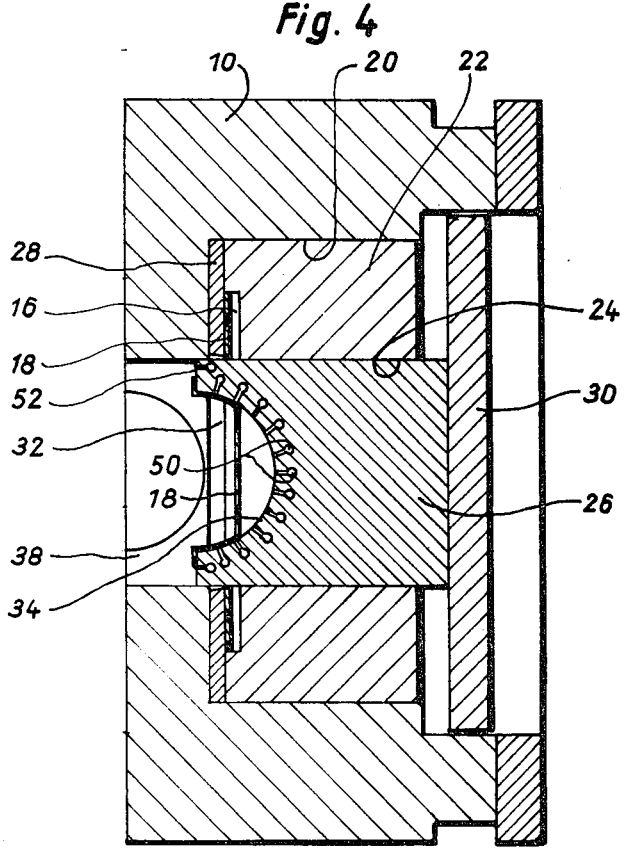
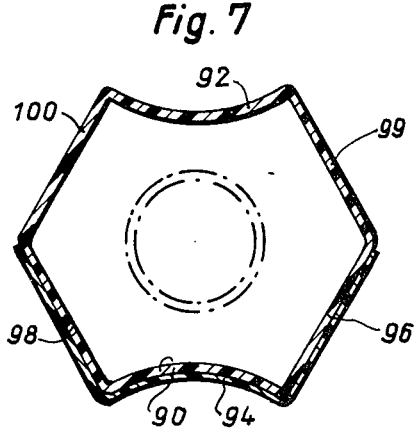
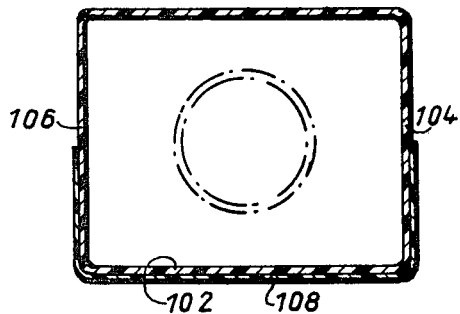

United States Patent Office 3,674,391
Patented July 4, 1972

3,674,391
APPARATUS FOR PRODUCING AND DECORATING HOLLOW BODIES MADE OF THERMOPLASTIC MATERIAL
Dieter Welle, Esslingen (Neckar), Germany, assignor to Etimex Interplastic G.m.b.H., Rapperswil-Jona, Switzerland
Filed Jan. 13, 1970, Ser. No. 7,301
Int. Cl. B29d 23/03
U.S. Cl. 425—109                                    7 Claims

ABSTRACT OF THE DISCLOSURE

Apparatus for producing and decorating hollow bodies in which a tubular blank is expanded in soft condition in a mould, while a punch reciprocable in a mould part cuts a label from a strip and applies it to the hollow body.

---

Figure 1:
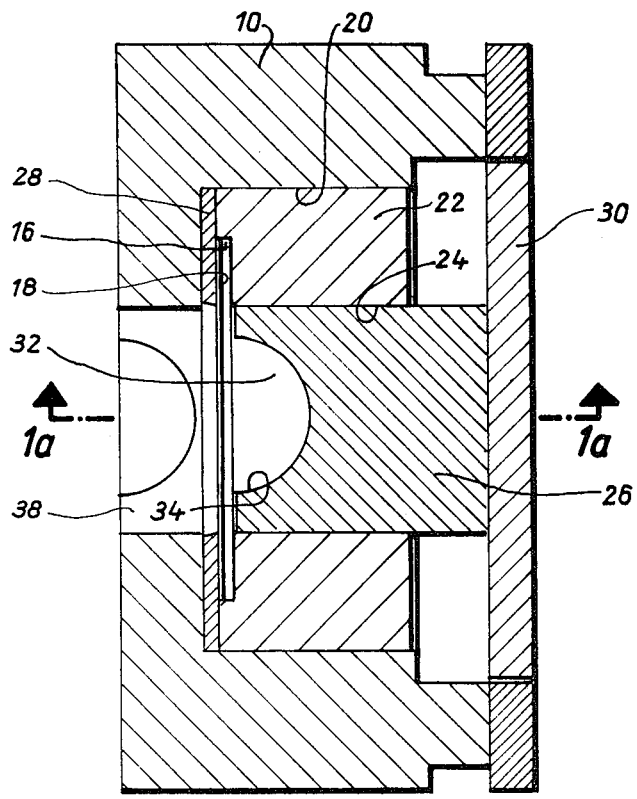

The present invention relates to apparatus of producing and decorating hollow bodies made of thermoplastic material, in which the plastic formed into a tubular blank is introduced between at least two parts of moulding tool divisible along at least one parting plane, said two parts of the tool defining a mould cavity, and in which a printed foil for the production of decorative fields is also introduced into the tool, a decorative field being stamped out of said printed foil, by means of cutting edges, for the purpose of producing a label when the parts of the tool are moved against each other into their closed position, said cutting edges lying in the parting plane of the tool when said parts of the tool have moved into their closed position, the hollow body being moulded after introducing a tubular blank into the mould cavity, said hollow body being brought into contact with the stamped-out motif under the action of the first heat and the injection and inflation pressures prevailing in the tool.

A method of producing and decorating a hollow body of thermoplastic material in a single operation has been known heretofore, said method of production being the subject matter of Germany patent application No. 1,168,053. According to said method of the prior art, a foil is introduced between the parts of the moulding tool defining the mould cavity in the parting plane of said tool when said tool is in the open position, the edges of the cavities provide in the tool parts, which together define the mould cavity, forming the cutting edges so that a decorative field is stamped out of said foil upon the moulding tool being closed.

When the hollow body is inflated, said decorative field is necessarily forced into the adjacent cavity by the tubular blank, being applied against, and sticking to, the circumference of said hollow body. The size of the decorative field equals the cross-sectional area of the inlet to the cavity receiving said decorative field so that the label is invariably smaller than the wall surface of said cavity. This means that only part of the circumference of the hollow body defined by the corresponding cavity may be decorated, i.e. covered with a label, by this method. In practice, this entails the disadvantage that hollow bodies cannot be decorated across half their circumference or their full circumference, i.e. all around.

The present invention eliminates this deficiency. To that end, it suggests that in performing a method of the type first above described a blanking punch be moved, in a manner known per se, relatively to an associated tool part, by which it is guided, in the direction of the tubular blank in order to stamp out each label and that, after the decorative motif has been stamped out, the cutting edges of said blanking punch be steered into the parting plane of the parts of which the moulding tool is comprised, said parts being displaceable relatively to each other.

The use of the blanking punch permits the cutting edges for separating the decorative motif from the foil to be disposed away from the edge of the cavity which together with at least one further cavity of a tool part defines the mould cavity of the moulding tool, thus enabling the size of the label to be fixed independently of the cross-section of the inlet to the cavity receiving the label by suitably disposing the cutting edges relatively to the edge of said cavity.

Thus, by suitably disposing the cutting edges on the blanking punch, the dimensions of the label may be selected so, for example, that the label covers half the circumference of a hollow body. Using two tool parts of identical design and disposed symmetrically to each other, for example, it is thus possible to decorate the circumference of a hollow body all around, irrespective of the circumferential shapes of the hollow bodies to be decorated.

The apparatus which, similarly to an apparatus disclosed in German Patent 1,168,053, is equipped with a moulding tool comprising at least two tool parts disposed so as to be displaceable relatively to each other and defining a mould cavity, a blanking punch being movably disposed in at least one of said tool parts, said blanking punch being associated with a flat tape which may be fed in a direction perpendicular to the direction in which said blanking punch moves and which may be stopped when one of the identical motifs is located in front of said blanking punch, the object being moulded after a tubular blank of thermoplastic material has been introduced into the mould cavity and being brought into contact with the stamped-out motif under the action of the first heat and the injection and inflation pressures prevailing in the tool, and which is characterized in that the cross-section of said blanking punch equals the area of the label to be transferred to the circumference of the hollow body when said label is unrolled in one plane and in that the face of said blanking punch is provided with a cavity whose surface corresponds to that portion of the outer surface of the plastic object to be produced which is to be decorated. In this apparatus, that part of the one cavity block which defines the circumference of the hollow body is formed by the blanking punch itself. The size of the label may thus be determined by the dimensions of the blanking punch as measured perpendicularly and parallelly to the centre line of the hollow body to be produced. The narrower the edge portions provided, disposed opposite each other and extending in parallel relation to the axial direction of the hollow body to be produced, with respect to the given size of the cavity disposed in the blanking punch, the smaller will be the length of the part of the label which extends along the circumference of the hollow body. Accordingly, if it be desired to cover the entire circumference of the hollow body defined by the punch cavity with a label, the length of the surface of the cavity disposed in the blanking punch developed in one plane, as viewed in the axial projection of the hollow body to be produced, must be equal to the dinmension of the blanking punch measured perpendicularly to the centre line of the hollow body to be produced. In the event of each tool part being equipped with a blanking punch according to the invention, the circumference of a hollow body may be completely covered with two labels in accordance with the above proposal if the blanking punch is of rectangular cross-section. Furthermore, the invention affords the possibility of providing hollow bodies with two labels of different circumferential shapes with the aid of an apparatus of the type described above by using blanking punches of different cross-sectional shapes. Alternatively, labels of identical shape may be used which will not necessarily cover the circumference of the hollow body completely. To achieve this effect, blanking punches of circular cross-section are particularly advantageous. It is evident that the invention may be embodied with equal advantage in apparatus whose punch cavities defining the mould cavity are symmetrical to each other or of different designs and different depths. In any case, it is an advantage to provide at least the one part of the tool in which the blanking punch is guided with a guide slot for the flat tape, said guide slot being disposed perpendicularly to the direction in which the blanking punch moves and penetrating the guide channel of the blanking punch in a plane in which the stamping operation by which the label is separated from the flat tape is completed. As a result of this measure, the length of punch travel and, consequently, the volume of air displaced into the mould cavity is kept as small as possible.

As a further advantageous development of the apparatus according to the invention, an arrangement is suggested in which, in a manner known per se, a plurality of passages disposed in the blanking punch and connected to a common induced-draught system end at the surface of the cavity disposed in the blanking punch. Provision of such suction passages within the blanking punch ensures proper contact between the stamped-out label and the surface of the cavity in the blanking punch defining the corresponding portion of the circumference of the hollow body.

An advantageous arrangement is one in which the blanking punch is associated with a blanking die disposed directly adjacent to the guide slot for the flat tape so that an accurate stamping contour may be achieved on the label. It is advisable to dispose the blanking punch in a guide body which together with the blanking punch and the blanking die constitutes an assembly which may be inserted into the tool part. This design proposal enables the blanking die to be properly aligned with respect to the blanking punch. Finally, an advantage may be obtained by associating the blanking punch with hold-down devices disposed in the guide body, said holddown devices enabling the flat tape to be clamped against the blanking die while the label is being stamped out, a favourable arrangement being one in which the drivers of said hold-down devices are being controlled by the blanking punch itself.

Figure 1A:
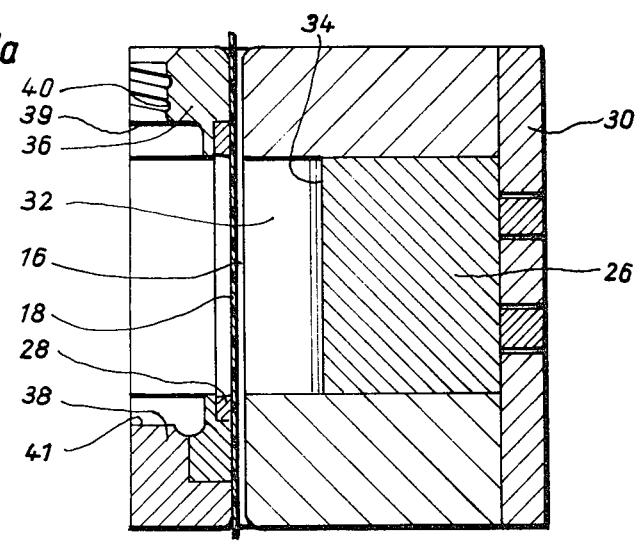
Figure 2:
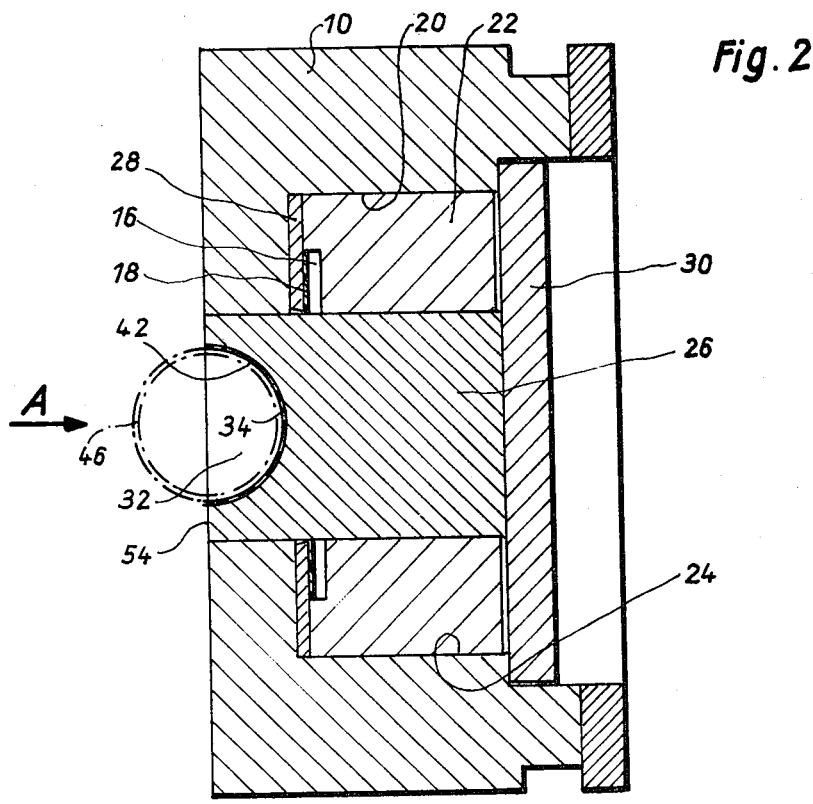
Figure 3:
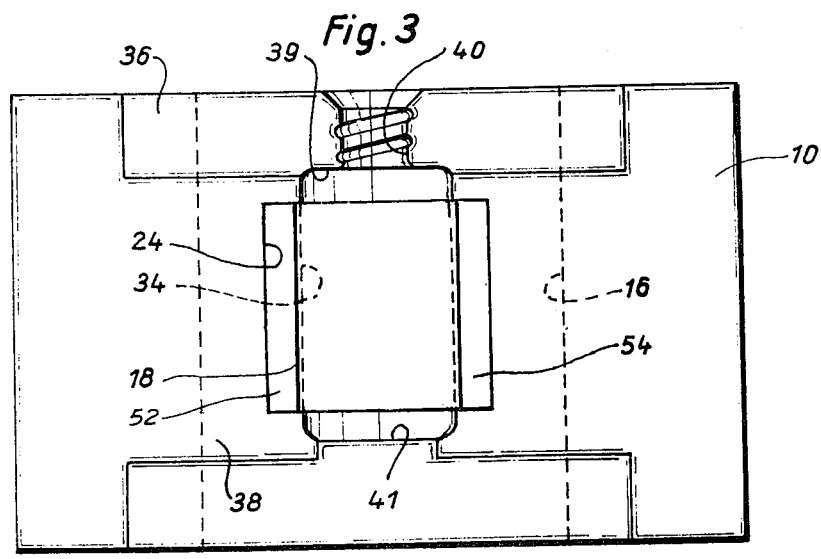
Figure 5:
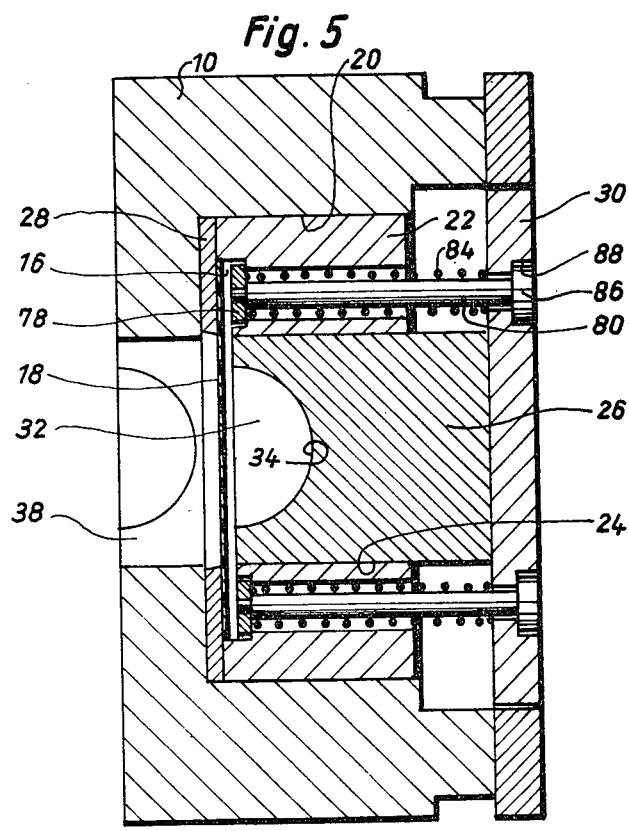
Figure 6:
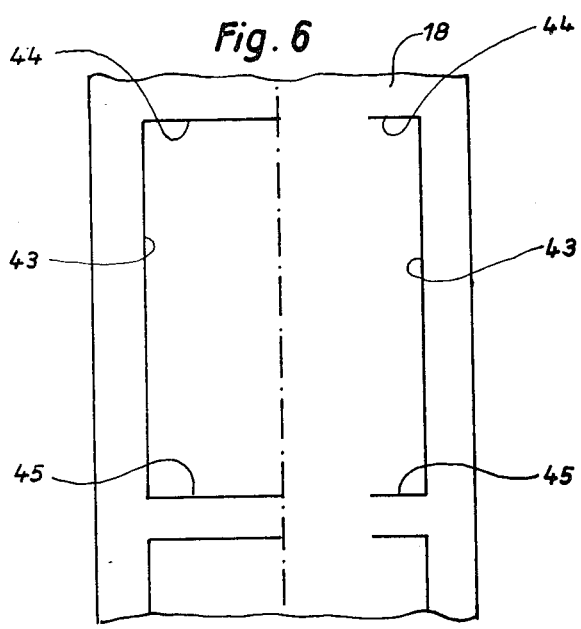
Figure 9:
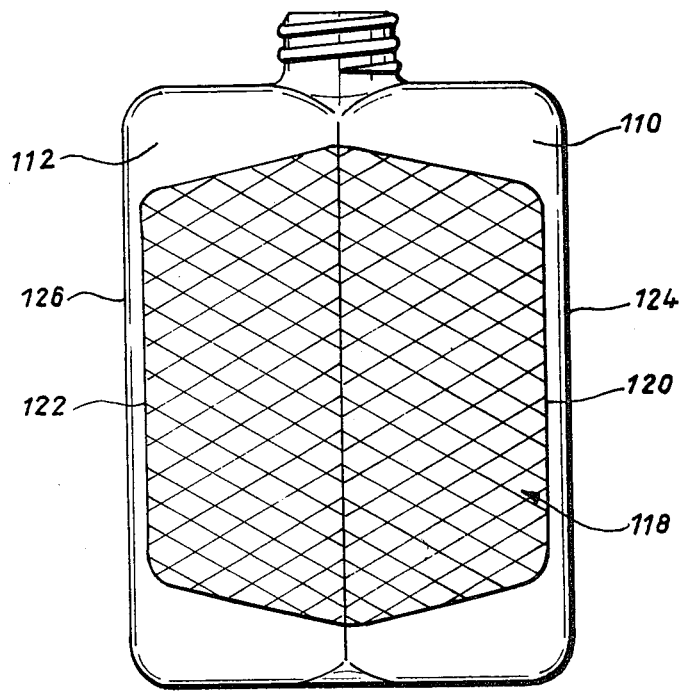
Figure 10:
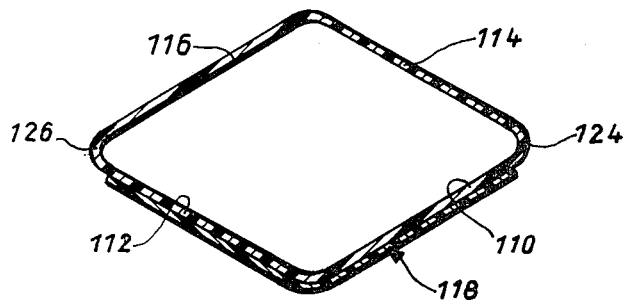

Tool halves of various embodiments of apparatus according to the invention, shown by way of example, and hollow bodies of different cross-sectional shapes produced and decorated with the aid of said apparatus are illustrated in the accompanying drawing, in which FIG. 1 is a section through a half of a moulding tool equipped with a blanking punch according to the invention, showing the blanking punch in its initial position and, in front of the blanking punch, the flat plastic tape to be stamped out, FIG. 1a is a section through the tool half according to FIG. 1 along the line 1a—1a, FIG. 2 is a representation corresponding to that of FIG. 1, showing the blanking punch in its extreme forward position and the stamped-out label in contact with the wall of the cavity disposed in the blanking punch, FIG. 3 is a view of the tool half in the direction indicated by the arrow A in FIG. 2, showing the position just after the label has been stamped out of the flat tape, FIG. 4 is a representation corresponding to that of FIG. 1, showing a section through a further embodiment of an apparatus according to the invention with a plurality of suction passages ending in the wall of the punch cavity, FIG. 5 is a representation corresponding to that of FIG. 1, showing a section through a tool half in which hold-down devices are provided for clamping the flat tape during the stamping operation, FIG. 6 is a top plan view of the flat tape passed through the differently designed tool halves and containing the decorative fields to be stamped out, the right-hand half of this figure showing the stamping contour in the flat tape just after the stamping operation has started, FIGS. 7, 8 and 10 show examples of various cross-sections of hollow bodies which may be produced and simultaneously decorated with the aid of the apparatus according to the invention, FIG. 9 is the front elevation of a plastic bottle, FIG. 10 is a cross-sectional view of the bottle shown in FIG. 9.

The tool part shown in FIGS. 1 through 3, representing one tool half of a first embodiment of the apparatus according to the invention, includes a mould block 10 with a guide slot 16 providing a passage for a flat tape 18, preferably made of thermoplastic material, which is printed with successive repeats of decorative motifs. A guide body 22, preferably made of bronze, in which a blanking punch 26 is guided in a guide channel 24, is disposed in a recess 20 of said mould block 10.

The guide channel continues through the mould block. A blanking die 28, which is replaceably secured in the guide body, is disposed between the guide body and the mould block. The guide body 22, the blanking punch 26, and the blanking die 28 together constitute an assembly which may be inserted into the mould block 10. At its extreme end, the blanking punch is provided with a plate 30 for actuation.

As will be apparent from the drawing, the blanking punch is provided with a cavity 32 whose wall surface 34 matches that portion of the outer surface of the hollow body to be produced which is to be decorated. The mould block 10 together with the blanking punch 26 forms the one cavity block of the moulding tool of the apparatus. It will be noted that the mould block features an upper cavity block component 36 and a lower cavity block component 38.

In the embodiment shown by way of example in FIGS. 1 through 3, the apparatus according to the invention is designed for the production of cylindrical bottles made of thermoplastic material. Accordingly, the upper cavity block component 36 defines the upper front wall 39 of the hollow body to be produced, provided with a filler neck 40, while the lower cavity block component 38 defines the bottom 41. In this embodiment of the invention, the design is such as to permit that half of the circumference of the bottle defined by the cavity 32 to be completely covered with a label with the aid of the blanking punch 26. To this end, the length of the surface of the cavity disposed in the blanking punch when developed in one plane, as viewed in the axial projection of the hollow body to be produced (see FIG. 1), equals the dimension of the blanking punch measured perpendicularly to the centre line of the hollow body to be produced and the cross-section of the blanking punch is of rectangular shape. The resulting effect is as follows:

With the two tool halves in their closed position, the blanking punch 26 is moved to its extreme forward position. During this movement, a decorative field denoted by 42 in FIG. 2 is stamped out of the flat tape 18 passed through the guide slot 16 and positioned in front of the blanking punch. At the time of the stamping operation, this label is of rectangular shape, corresponding to the cross-section of the blanking punch (see FIG. 3). Details of the stamping operation are shown in FIG. 6. Initially, the outer contours of the label with the exception of the portion bridged by the upper and lower edge pieces of the cavity 32 in the blanking punch 26 are stamped out of the flat tape 18 at once. This is shown in the right-hand half of FIG. 6, where 43 denotes the lateral, 44 the upper, and 45 the lower stamping contour. As the blanking punch is further displaced in the course of a continuous process, the label is completely separated from the flat tape by the upper and lower curved edges of the punch cavity 32 so that the upper and lower stamping contours extend across the entire field (see left-hand half of FIG. 6).

Since the tubular blank indicated by dot-dash lines and denoted by 46 in FIG. 2 has been introduced into the mould cavity at the start of the stamping operation at the latest, the label comes into contact with the circumference of the tubular blank and, as clearly shown in FIG. 2, and is drawn into the cavity 32 of the blanking punch 26, being snugly applied against the wall surface of said cavity as the hollow body is inflated. The plastic melt constituting the material of the tubular blank now combines with the plastic foil of which the label is made so that the label is permanently joined to the circumference of the hollow body. If the design of the second tool half, which is not shown in the accompanying drawing, is symmetrical to that of the tool half according to FIGS. 1 and 2, such hollow body may be provided with a decoration extending all around its circumference without interruption. Furthermore, an arrangement can be imagined in which e.g. the blanking punch of the other tool half has a different, e.g. circular, cross-section so that a hollow body may be decorated, in the mould cavity, with labels of different shapes.

The design of the embodiment shown by way of example in FIG. 4 differs from that of the the embodiment described above inasmuch as the wall 34 of the blanking punch cavity 32 is provided with a plurality of openings 50. These openings are preferably also disposed in the strip-type face portions 52 and 54 of the blanking punch. According to an arrangement not shown in detail, these openings are connected to an induced-draught system, by means of which the label 42 is automatically applied against the wall surface 34 of the punch cavity 32 and fixed in that position during the feeding motion.

In the embodiment shown by way of example in FIG. 5, parts identical with those appearing in FIG. 1 are denoted by like numerals. Unlike the design shown in FIG. 1, the embodiment shown in FIG. 5 is provided with hold-down devices 78 disposed in the guide body 22, said hold-down devices being connected to the driving plate 30 secured to the blanking punch 26 through a connecting pin 80 penetrating the guide body. A compression spring 84 bearing against the hold-down device at the one end and against the driving plate 30 at the other end is disposed on the connecting pin 80. The connecting pin is axially displaceable in the driving plate 30 and equipped with a driving head 86 engaging a mating recess 88 in the driving plate. The hold-down devices, which are disposed in the upper and lower parts of the guide slot, may be moved in the direction of the blanking die and enable the flat tape 18 to be clamped against the blanking die in order to obtain neat stamping contours. When a decorative field is stamped out, the hold-down devices automatically move into their hold-down position under the action of the compression spring 84, whereas when the blanking punch returns to its initial position they are retured to their initial position shown in FIG. 5 by the driving heads 86 of the connecting pins 80.

The following is a description of various forms of hollow bodies which may be produced and simultaneously decorated with the aid of the apparatus according to the invention, reference being made to FIGS. 7 through 10.

The embodiment shown by way of example in FIG. 7, represents a plastic bottle of hexagonal cross-section having concave front and rear wall portions 90 and 92 respectively. The numeral 94 denotes a label covering both the front wall portion 90 and the contiguous wall portions 96 and 98. It shall be understood that the other wall portions 92, 99, and 100 may also be covered with a label in a like manner.

FIG. 8 shows a cross-section of a plastic bottle which is of rectangular shape. Again, the front wall 102 and parts of the lateral walls 104 and 106 are covered with a label 108 such that the circumference of the bottle is decorated preferably across the entire range of its one half.

FIG. 9 shows a plastic bottle of diamond-shaped cross-section (see FIG. 10). The front and rear surfaces of this bottle are defined by the wall portions 110, 112 and 114, 116 respectively, said wall portions being disposed so as to include between them an obtuse angle each. The front surface of this bottle, i.e. the wall portions 110, 112, carries a label generally denoted by the numeral 118. This label may, for instance, take the form of an irregular hexagon. It is affixed to the wall portions 110, 112 so that two opposite sides 120, 122, which are longer than the other sides of the label, whose lengths are equal to each other, extend in parallel relation to the lateral edges 124, 126 of the body of the bottle. The corners of the label are preferably rounded.

In a general manner, while there has been disclosed effective and efficient embodiments of the invention, it should be well understood that the invention is not limited to such embodiments, as there might be changes made in the arrangement, disposition, and form of the parts without departing from the principle of the present invention.

What we claim is:

1. Apparatus for producing and for decorating hollow bodies, said apparatus comprising a mould having at least two mould parts movable between an open and a closed position in which said parts meet along a parting face, at least one of said mould parts being formed with a passage extending transverse to said parting face therethrough; guide means for guiding a strip of connected labels across said passage; and a punch guided in said passage for reciprocation between a retracted position in which an end face of said punch is located to one side of a strip in said guide means and an advanced position, the periphery of said end face defining a cutting edge for cutting a label from a strip of labels and said cutting edge encompassing an area equal to that of one of said labels in flat condition, said punch having at said end face a non-planar face portion which is at least in part inwardly spaced from said cutting edge and which forms when said punch is in said advanced position, together with cavities in said mould parts, a common mould cavity, the surface of said non-planar portion corresponding to that portion of the outer surface of the hollow body which is to be decorated and therewith to that of the label when applied to said outer surface, whereby when a tubular blank of thermoplastic material in heated and soft condition is introduced into said mould cavity and said punch is moved to said advanced position, a label will be attached in foldless condition to an outer surface portion of a hollow body produced in the mould by feeding pressure fluid into the tubular blank and expanding the latter in said mould cavity.

2. An apparatus as defined in claim 1, wherein said parting face and said end face of said punch, with the exception of said face portion, are planar faces.

3. An apparatus as defined in claim 2, wherein said non-planar face portion curves concavely from said end face into said punch.

4. An apparatus as defined in claim 1, wherein said guide means comprise a slot extending through said one mould part transversely across said passage and adjacent said parting face so that said cutting of a label from said strip by said punch is carried out directly before the latter reaches its advanced end position.

5. An appaartus as defined in claim 4, and including a die plate in said one mould part located in the direction of movement of said punch from said retracted to said advanced position, rearwardly of said slot, said die plate having a cutting edge corresponding to that of said punch.

6. An apparatus as defined in claim 5, and including a guide body inserted in said one mould part in which said passage for said punch is formed, said guide body, said die plate and said punch forming a unit insertable in and removable from said one mould part as a unit.

7. An apparatus as defined in claim 1, wherein said punch is formed with a plurality of suction passages ending at said non-planar face portion.

References Cited

UNITED STATES PATENTS 3,267,186   8/1966   Battenfeld _____ 18—5 BL X

H. A. KILBY, JR., Primary Examiner

U.S. Cl. X.R.

425—326, 298; 156—500